United States Patent
Johann et al.

(10) Patent No.: US 9,822,795 B2
(45) Date of Patent: Nov. 21, 2017

(54) STATOR OF AN AXIAL COMPRESSOR STAGE OF A TURBOMACHINE

(75) Inventors: Erik Johann, Berlin (DE); Frank Heinichen, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 613 days.

(21) Appl. No.: 13/431,427

(22) Filed: Mar. 27, 2012

(65) Prior Publication Data

US 2012/0251312 A1 Oct. 4, 2012

(30) Foreign Application Priority Data

Mar. 28, 2011 (DE) .................. 10 2011 006 275

(51) Int. Cl.
*F01D 9/04* (2006.01)
*F04D 29/54* (2006.01)
*F04D 29/52* (2006.01)
*F04D 29/68* (2006.01)

(52) U.S. Cl.
CPC .............. *F04D 29/542* (2013.01); *F01D 9/04* (2013.01); *F04D 29/522* (2013.01); *F04D 29/547* (2013.01); *F04D 29/681* (2013.01); *F05D 2220/3216* (2013.01); *F05D 2250/70* (2013.01); *F05D 2250/71* (2013.01)

(58) Field of Classification Search
CPC . F01D 9/00; F01D 9/041; F01D 5/143; F01D 11/001; F05B 2240/00; F05B 2240/121; F05B 2240/122; F02C 7/28
USPC ........................................................ 415/86
See application file for complete search history.

(56) References Cited

U.S. PATENT DOCUMENTS

| | | | |
|---|---|---|---|
| 3,890,060 A | 6/1975 | Lipstein | |
| 4,531,362 A | 7/1985 | Barry et al. | |
| 4,540,335 A | 9/1985 | Yamaguchi et al. | |
| 5,067,876 A | 11/1991 | Moreman, III | |
| 5,137,419 A | 8/1992 | Waterman | |
| 5,725,353 A | 3/1998 | Matheny et al. | |
| 5,950,308 A * | 9/1999 | Koff et al. | ........ 29/889.2 |
| 6,017,186 A | 1/2000 | Hoeger et al. | |

(Continued)

FOREIGN PATENT DOCUMENTS

| | | |
|---|---|---|
| DE | 4108930 | 10/1991 |
| DE | 3521798 | 8/1992 |

(Continued)

OTHER PUBLICATIONS

European Search Report dated Jun. 16, 2014 from counterpart application No. 12161404.4.

(Continued)

*Primary Examiner* — Justin Seabe
(74) *Attorney, Agent, or Firm* — Shuttleworth & Ingersoll, PLC; Timothy Klima

(57) ABSTRACT

The present invention relates to a stator of an axial compressor stage of a turbomachine featuring a radially outer blade ring forming an outer ring surface, a radially inner blade ring forming an inner ring surface, and several stator blades connected to the blade rings. It is provided that the outer ring surface and/or the inner ring surface has at least in a partial area a changing radius relative to a central axis of the stator both in the axial direction and in the circumferential direction.

21 Claims, 5 Drawing Sheets

(56) References Cited

U.S. PATENT DOCUMENTS

Figure 1:
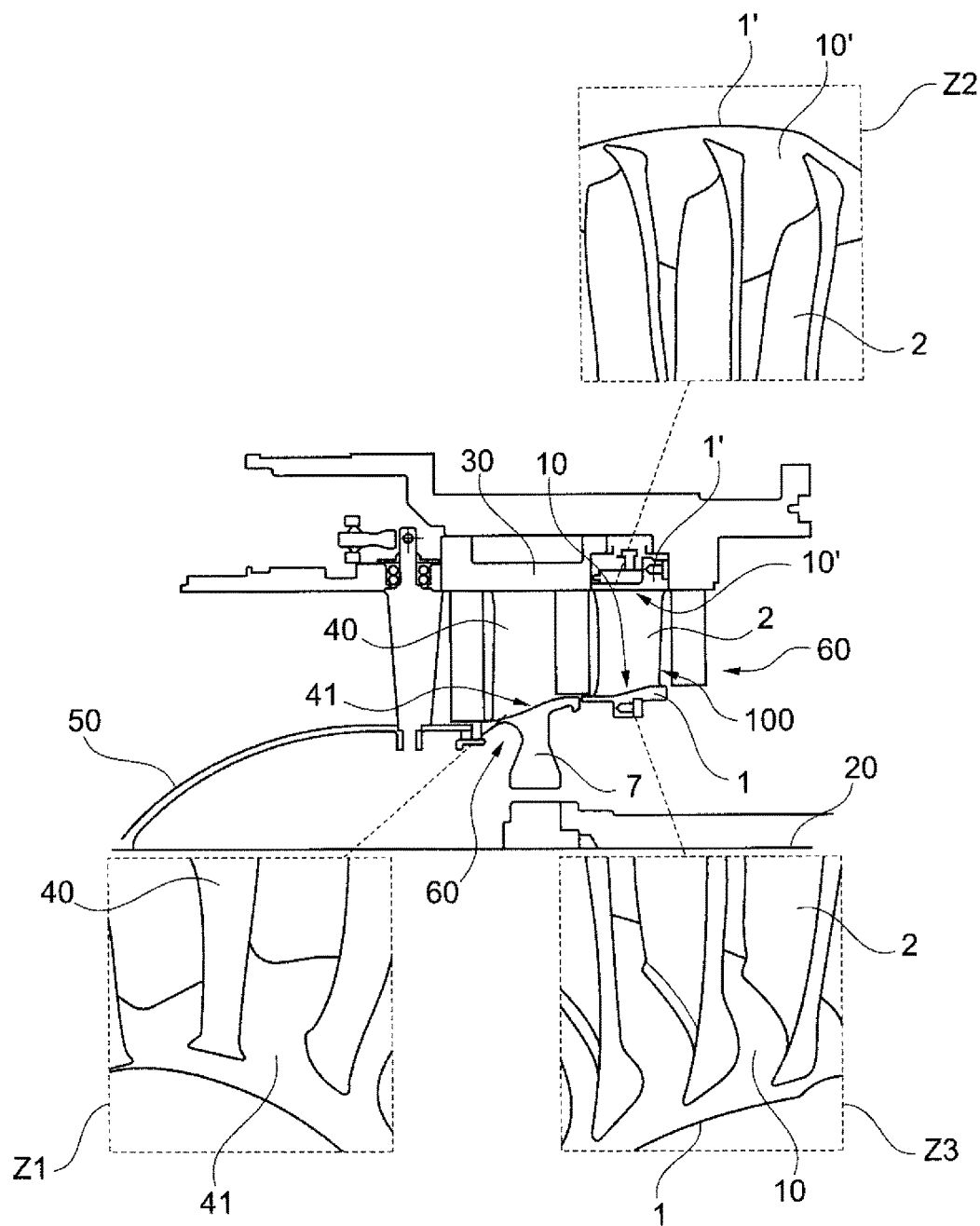

| | | | |
|---|---|---|---|
| 6,283,713 B1 | 9/2001 | Harvey et al. | |
| 6,290,458 B1 | 9/2001 | Irie et al. | |
| 6,409,469 B1 | 6/2002 | Tse | |
| 6,561,761 B1* | 5/2003 | Decker et al. | 415/173.1 |
| 6,736,594 B2 | 5/2004 | Irie et al. | |
| 6,969,232 B2* | 11/2005 | Zess et al. | 415/191 |
| 7,134,842 B2* | 11/2006 | Tam et al. | 416/193 A |
| 7,220,100 B2* | 5/2007 | Lee et al. | 415/191 |
| 7,354,243 B2* | 4/2008 | Harvey | 415/191 |
| 7,909,570 B2* | 3/2011 | Durocher et al. | 415/174.5 |
| 8,192,154 B2 | 6/2012 | Sonoda et al. | |
| 8,439,643 B2 | 5/2013 | Kuhne et al. | |
| 8,678,740 B2 | 3/2014 | Praisner et al. | |
| 8,684,684 B2* | 4/2014 | Clements et al. | 415/193 |
| 8,690,523 B2 | 4/2014 | Guemmer | |
| 8,721,280 B2* | 5/2014 | Nakagawa et al. | 415/222 |
| 2002/0127108 A1 | 9/2002 | Crall et al. | |
| 2005/0111968 A1 | 5/2005 | Lapworth | |
| 2006/0140768 A1 | 6/2006 | Tam et al. | |
| 2007/0059177 A1 | 3/2007 | Harvey | |
| 2007/0160459 A1 | 7/2007 | Tudor | |
| 2007/0224038 A1 | 9/2007 | Solomon et al. | |
| 2007/0258810 A1 | 11/2007 | Aotsuka et al. | |
| 2007/0258819 A1* | 11/2007 | Allen-Bradley et al. | 416/193 A |
| 2008/0199306 A1 | 8/2008 | Lebret | |
| 2008/0232968 A1 | 9/2008 | Nguyen | |
| 2009/0246007 A1 | 10/2009 | Johann | |
| 2010/0014956 A1 | 1/2010 | Guemmer | |
| 2010/0098536 A1 | 4/2010 | Guemmer | |
| 2010/0172749 A1 | 7/2010 | Mitsuhashi et al. | |
| 2011/0189023 A1 | 8/2011 | Guimbard et al. | |
| 2012/0201692 A1 | 8/2012 | Boston et al. | |

FOREIGN PATENT DOCUMENTS

| | | |
|---|---|---|
| DE | 69728500 | 8/2004 |
| DE | 60130577 T2 | 6/2008 |
| DE | 102007056953 | 5/2009 |
| DE | 102008021053 | 10/2009 |
| DE | 102008052401 | 4/2010 |
| EP | 1199439 | 4/2002 |
| EP | 1239116 | 9/2002 |
| EP | 1760257 | 3/2007 |
| EP | 1783346 | 5/2007 |
| EP | 2096316 | 9/2009 |
| EP | 1087100 | 4/2010 |
| EP | 2180195 | 4/2010 |
| GB | 2245312 | 1/1992 |
| GB | 2281356 | 3/1995 |
| GB | 2408546 | 6/2005 |
| WO | 199534745 | 12/1995 |
| WO | 2008046389 | 4/2008 |
| WO | 2009112776 A2 | 9/2009 |
| WO | 2009129786 | 10/2009 |
| WO | 2011022111 | 2/2011 |
| WO | 2011039352 A2 | 4/2011 |

OTHER PUBLICATIONS

European Search Report dated May 12, 2014 for related European Application No. 12164964.
Johann—U.S. Appl. No. 13/431,408, filed Mar. 27, 2012.
Johann—U.S. Appl. No. 13/451,657, filed Apr. 20, 2012.
European Search Report dated Dec. 3, 2014 from related app No. EP 12161401.
European Examination Report dated Oct. 26, 2015 for related European Patent Application No. 12 164 964.4.
F. Taremi and S.A. Sjolander and T.J. Praisner, Application of Endwall Contouring to Transonic Turbine Cascades: Experimental Measurements at Design Conditions, Proceedings of ASME Turbo Expo 2011, GT2011-46511, Jun. 5-10, 2011, Vancouver, Bristish Columbia, Canada.
F. Heinichen, V. Guemmer, A. Plas & H.-P. Schiffer, Numerical Investigation of the Influence of Non-Axisymmetric Hub Contouring on the Performance of a Shrouded Axial Compressor Stator, CEAS Aeronautical Journal, ISSN 1869-5582, vol. 2, pp. 89-98, Combined 1-4, 2011.
E. Dick, Fundamentals of Turbomachines, Fluid Mechanics and Its Applications, Springer, pp. 254-263, ISBN 978-94-017-9626-2, 2015.
Herausgegeben Von Prof. Dr. Ing Habil, Heinz M. Hiersig, VDI-Lexikon Maschinenbau, Lexicon Mechanical Engineering published by the Association of German Engineers, p. 193-194, 1995.
European Examination Report dated Feb. 10, 2016 for counterpart European application No. 12161404.4.

* cited by examiner

STATOR OF AN AXIAL COMPRESSOR STAGE OF A TURBOMACHINE

This application claims priority to German Patent Application DE102011006275.0 filed Mar. 28, 2011, the entirety of which is incorporated by reference herein.

This invention relates to a stator of an axial compressor stage of a turbomachine. Stators of this type are used for example in jet engines.

Axial compressors usually consist of a plurality of compressor stages each including a rotor and a stator connected directly behind one another. A plurality of aerodynamically shaped elements, referred to as rotor blades, are arranged on the rotor. A plurality of aerodynamically shaped elements, referred to as stator blades or stator vanes are likewise arranged on the stator. The rotor blades and the stator blades are provided alternatingly in a flow duct of the compressor.

A rotor configuration is known from the publication EP 1 087 100 B1 in which the outer surface of the circumferential ring of the rotor has a concave curvature in the area between two rotor blades. This is intended to improve the low cycle fatigue of the circumferential ring.

There is a need for technical solutions that improve the flow in the blade duct between two each stator blades of a stator. In particular, an attempt must be made to improve the efficiency and the stability of the flow and to reduce the risk of a flow separation at the blades.

In this connection 3a stator, which has a radially outer blade ring with an outer ring surface and a radially inner blade ring with an inner ring surface, the outer ring surface and/or the inner ring surface has at least in a partial area a changing radius relative to a central axis of the stator both in the axial direction and in the circumferential direction. The radially inner limiting surface and/or the radially outer limiting surfaces of a blade duct formed by two adjacent stator blades and the aforementioned ring surfaces of the stator are therefore three-dimensionally contoured.

The solution in accordance with the invention thus provides that the outer casing-side surface and/or the inner hub-side surface of the structure that delimit the stator blades on the inside and on the outside is contoured three-dimensionally. In particular, it is provided that the radius of the respective surface changes both in the axial direction (i.e. in the flow direction) and in the circumferential direction. This means that—in at least one partial area of the respective surface—adjacent points of the surface have both in the circumferential direction and in the axial direction a different distance to the central axis of the stator.

The three-dimensional contouring of the outer and/or the inner ring surface in accordance with the present invention dispenses with the symmetry restrictions predominating in the state of the art for the design of the ring surface. The result of this is new degrees of freedom in the design of the ring surface, permitting the flow in the blade duct to be favourably influenced, in particular the flow conditions on the walls of the blade duct or the annular space, respectively. In this way, it is possible with the solution in accordance with the invention to reduce rim losses, increase the blade deflection in the rim area and to increase efficiency. The risk of a flow separation at the blades (so-called blockage) is reduced.

The solution in accordance with the invention thus permits in one embodiment, with identical compressor design, a reduction of about 15% in the number of stator blades and of about 5% in the number of rotor blades. With identical deflection losses, the efficiency can be increased by up to 1%. The reduced number of blades leads here to a lower weight and to reduced costs. Here too the sensitivity of the leakage losses falls in the case of a sealing gap change.

The stator in accordance with the invention can be manufactured without extra costs, particularly when the respective ring surfaces are produced by metal-cutting techniques. In this way, the ring surface can undergo a three-dimensional contouring for this case without extra production-related effort.

It is pointed out that the three-dimensional contouring of the respective ring surface in the area of a stator blade is by its nature interrupted, since the stator blade is arranged in this area. The transition between the ring surface and a stator blade can be designed here unsteady (as an edge) or steady (by providing a fillet radius) in the mathematical sense. Any transition areas present which incorporate a fillet radius between the ring surface and the stator blade represent here in the meaning of the present invention a partial area of the stator blade, and not a partial area of the ring surface. Since transition areas of this type have a defined fillet radius, they are clearly distinguishable from the ring surface. Surface areas of a blade ring axially in front of and/or axially behind and/or in the circumferential direction between the stator blades are thus referred to as the ring surface in the meaning of the present invention, but not the stator blades themselves nor transition areas to the stator blades.

It is furthermore pointed out as a precaution that the change in the radius in accordance with the invention both in the axial direction and in the circumferential direction is so important that it is outside the tolerance range for surface machining. The contouring in accordance with the invention provides a flow-influencing three-dimensional contouring of the outer and/or the inner ring surface.

In the following, the radially outer blade ring and/or the radially inner blade ring and their outer ring surface and/or inner ring surface respectively are considered. If the present description does not differentiate between these blade rings and ring surfaces, the respective statement applies for both blade rings and ring surfaces.

In an embodiment of the invention, it is provided that for at least one section through the blade ring in a plane vertical to the central axis of the stator, the resulting surface line between two stator blades has at least in some sections a steadily changing radius. If a cylinder coordinate system is considered with the three coordinates of a) circumferential angle ($\phi$), b) distance ($r$) from the rotary axis and c) coordinate in the axial direction ($x$), then a section through the blade ring in a plane vertical to the central axis corresponds to a section through the ring surface with a fixed axial value ($x$). With the stated variant of the invention, it is in other words the case that in the surface line the radius ($r$) between two stator blades steadily changes depending on the circumferential angle ($\phi$). A curve of this type in the circumferential direction applies for at least some axial values ($x$) and in one embodiment for all axial values ($x$), i.e. for the entire ring surface.

In a further embodiment of the invention, it is provided that for at least one section through the blade ring in a plane vertical to the central axis of the stator, the resulting surface line in the area between two stator blades is asymmetrical. A symmetrical course in the circumferential direction between two stator blades is dispensed with in this design variant, the consequence being greater design latitude. The fact that the stated feature should apply for at least one section means that it applies for one of the possible sections, a minority of the possible sections, a majority of the possible sections or all sections, where it is assumed that two sections are identical provided they do not have a minimum distance from one another.

In one design variant of this it is provided that the ring surface adjoining the suction side of the one stator blade has higher radii than that adjoining the pressure side of the other, adjacent stator blade. Thus a convex elevation or a peak is created on the suction side, while on the pressure side a convex depression or valley is provided. As a result it can be achieved in one design variant that stresses on the pressure side and the suction side are distributed more evenly.

In a further design variant, it is provided that for at least one section through the blade ring in a plane vertical to the central axis of the stator, the resulting surface line between two stator blades in at least one section has a convex bulge. Thus at least in one partial area of the ring surface a peak is formed between two adjacent stator blades.

A variation of the radius of the ring surface is in accordance with the invention also present in the axial direction. In the following, a number of exemplary embodiments for a corresponding surface contouring in the axial direction are considered, with a longitudinal section through the blade ring and the resulting surface line between an axially front face and an axially rear face of the blade ring being considered in each case. A longitudinal section of this type corresponds in the case of a consideration in cylinder coordinates to a section with constant or substantially constant circumferential angle ($\phi$). The axially front face can also be referred to as blade leading edge and the axially rear face as blade trailing edge of the blade ring. The terms "front" and "rear" relate here to the flow direction.

In an embodiment, it is provided that the resulting surface line between a front face and an axially rear face has at least in some sections a steadily changing radius.

In a further embodiment, it is provided that the resulting surface line between a front face and an axially rear face in at least one section has a convex bulge, i.e. is designed as a peak. A design variant of this provides that the surface line in the direction of the blade trailing edge initially passes through a minimum and then a maximum. For the ring surface, this means that it passes in the direction of the blade trailing edge first through a valley and then a peak. As a result the gas flow is introduced in a favourable way into the blade duct.

The three-dimensional design in accordance with the invention, which dispenses with symmetries in the area of the surface design between two stator blades, permits in general terms any number of degrees of freedom for surface design. In an embodiment of the invention, it is provided that this large number is reduced in that a first surface line of a first section through the blade ring in a plane vertical to the central axis of the stator conforms to a sine function, a cosine function or to a combination of sine and cosine functions. At least one second surface line of a second section through the blade ring adjacent to the first section obeys the same function, with however a different phase position being provided relative to the first surface line.

In other words, each section through the ring surface in a plane vertical to the central axis has a surface line defined by one or more sine or cosine functions or their combination. In the case of sections through the ring surface made with other axial values (x), the same trigonometric functions apply. Only the phase position and/or the amplitude is varied depending on the axial position (x). As a result, the number of degrees of freedom is reduced, in one embodiment to 2 to 5. This permits for example a comparatively simpler programming of a metal-cutting machine, using which a ring surface is produced.

According to a further design variant, the ring surface on the axially front and/or the axially rear face of the blade ring is designed continuously circular. At the inlet side and/or the outlet side of the blade ring, a circular rim with fixed radius is provided. The three-dimensional contouring flattens off accordingly towards the faces of the blade ring. This provides a loss-free transition from one blade row to an adjoining blade row.

It is provided in an embodiment of the invention that the ring surface between all stator blades of the stator has the same three-dimensional contour in each case. The arrangement is symmetrical relative to a rotation about an angle corresponding to the distance between two stator blades.

Figure 2:
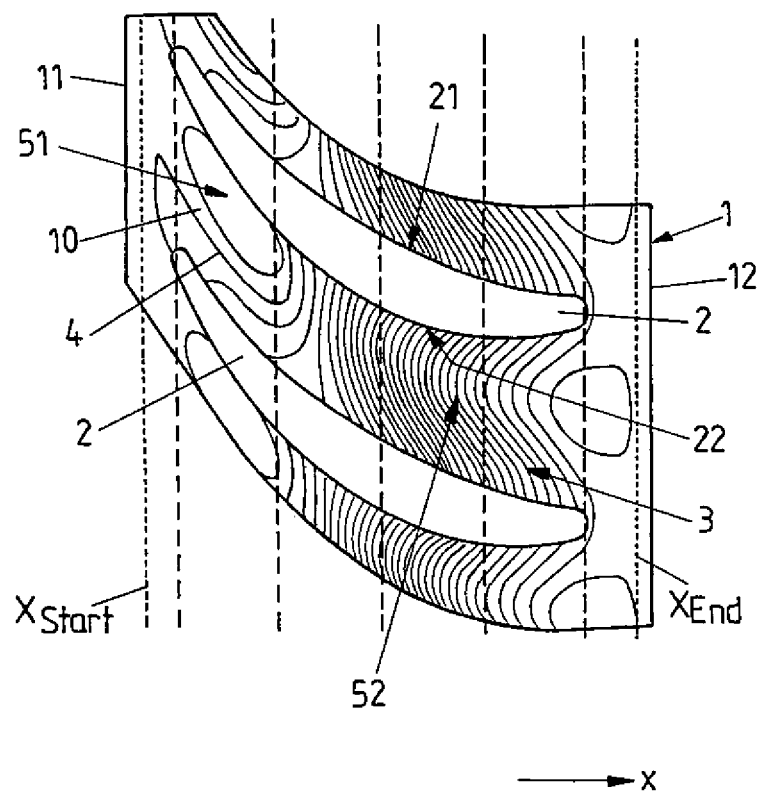
Figure 3A:
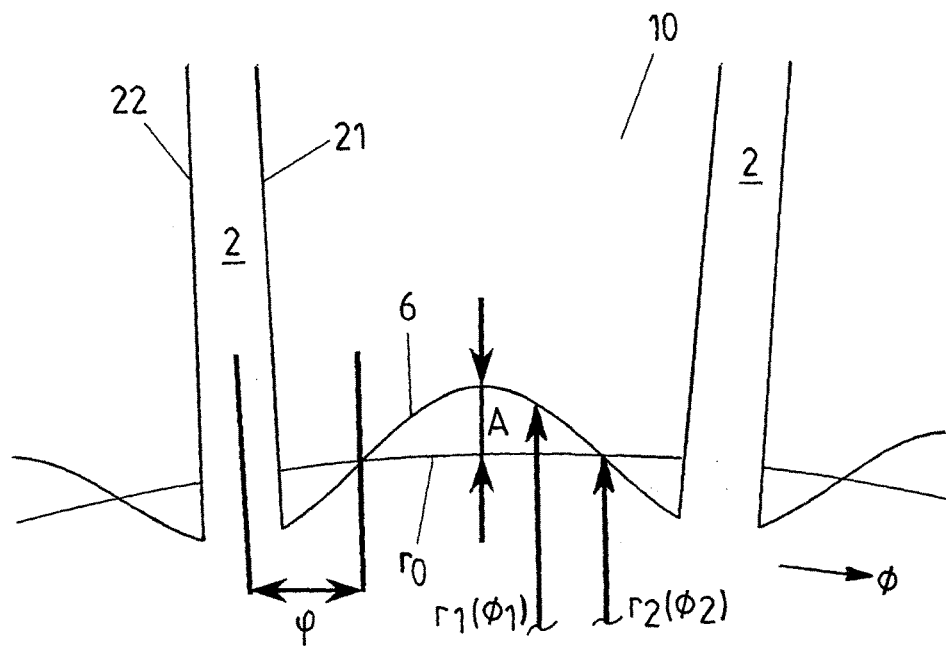
Figure 3B:
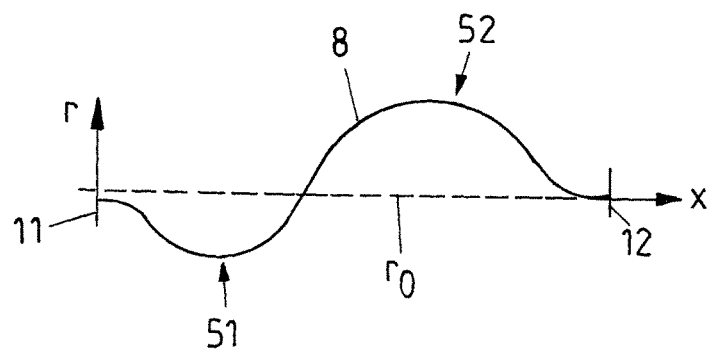
Figure 4:
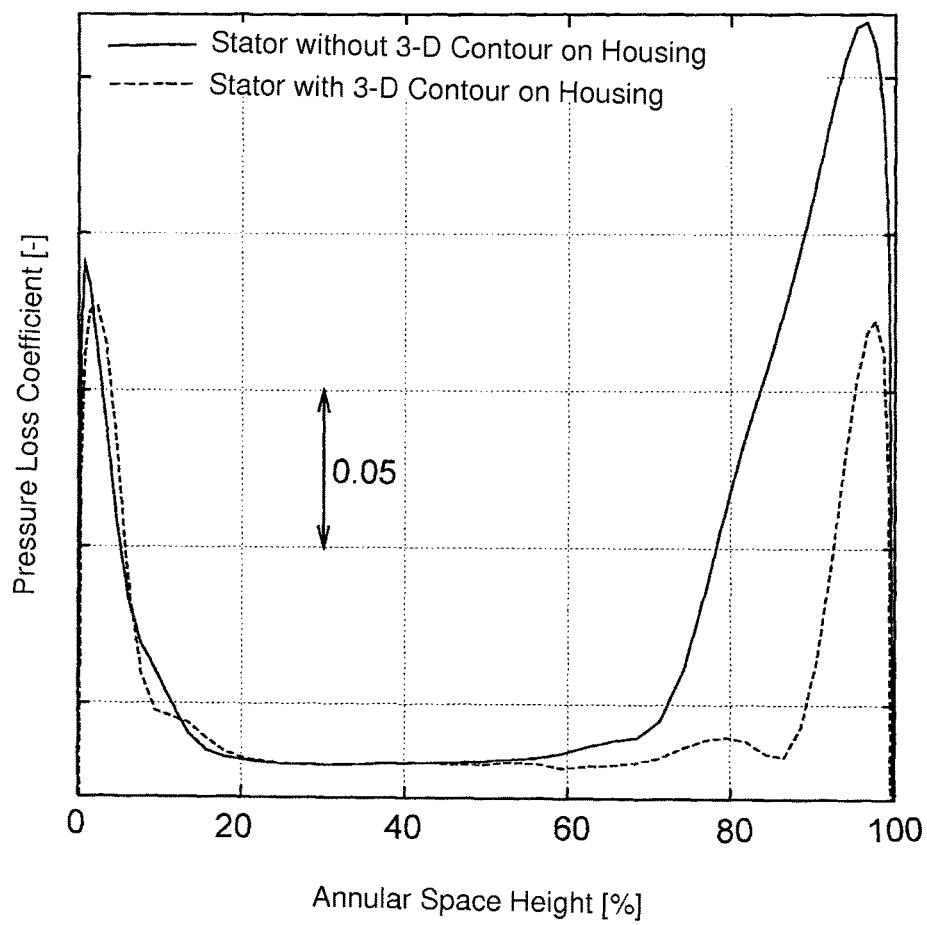
Figure 5:
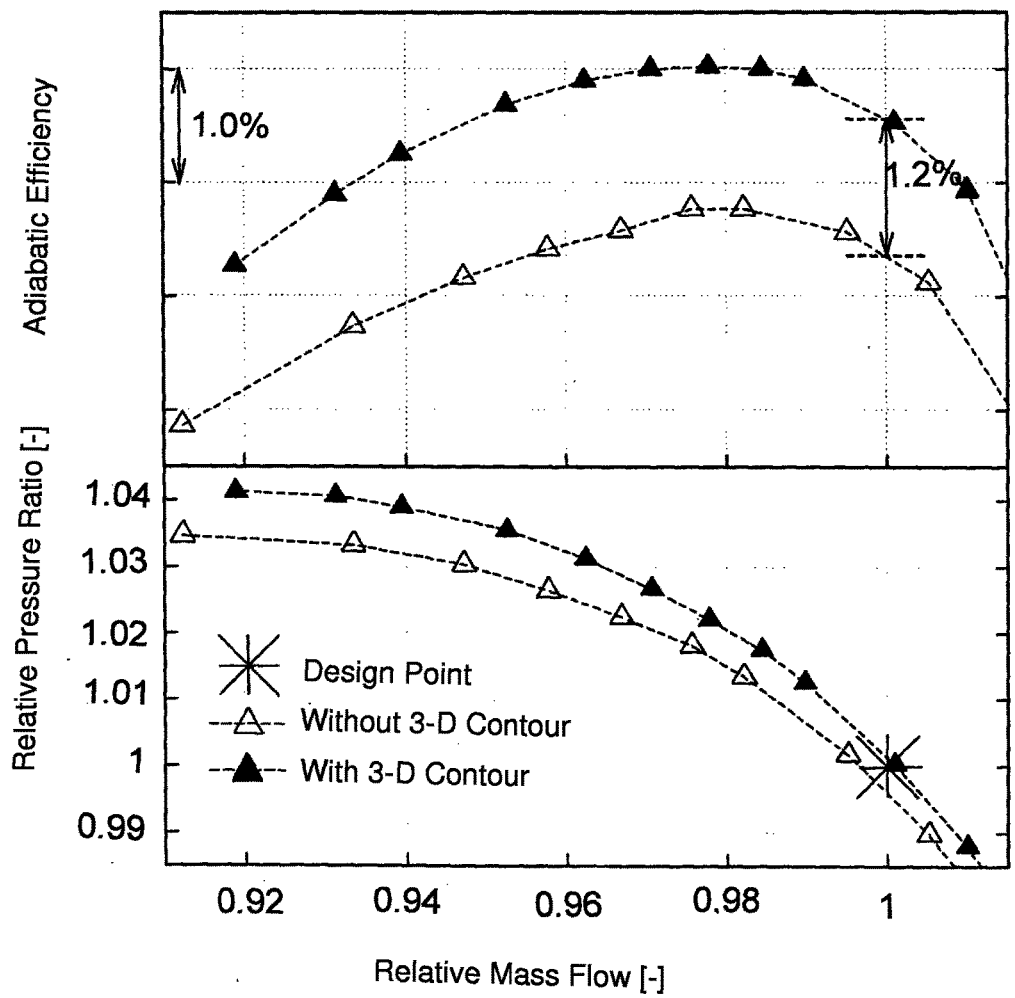

The present invention is described in the following in light of the figures of the accompanying drawing, showing several embodiments. In the drawing, FIG. 1 shows a longitudinal section through an exemplary embodiment of a compressor of a jet engine, with three-dimensionally contoured surfaces being shown on a rotor and on a stator of the compressor, FIG. 2 shows a plan view in the radial direction onto a partial area of a stator featuring an inner blade ring with a three-dimensionally contoured inner ring surface, FIG. 3A shows in schematic form a view in the flow direction towards a section transverse to the central axis of a stator with a three-dimensionally contoured ring surface, with the variation of the radius of the ring surface being shown, FIG. 3B shows in schematic form a longitudinal section through a blade ring of a stator with a three-dimensionally contoured ring surface, FIG. 4 shows a diagram showing the pressure loss coefficient as a function of the annular space height (duct height) of a stator with three-dimensionally contoured surface in comparison with a conventionally designed stator, and FIG. 5 shows a diagram indicating firstly the total pressure ratio and secondly the adiabatic efficiency as a function of the reduced mass flow for a stator designed in accordance with the present invention in comparison with a conventionally designed stator.

FIG. 1 shows in a sectional view the start area in an exemplary embodiment of a jet engine, where an inlet cone 50 with a row of inlet stator blades and a compressor 60 adjoining it are illustrated. The compressor 60 includes rotors and stators, with the rotors rotating about a central rotary axis 20. The central rotary axis 20 represents at the same time a central axis 20 and a symmetry axis for the stators.

A stator 100 is shown that has a radially inner blade ring 1 and a radially outer blade ring 1'. Stator blades 2 extend between the radially inner blade ring 1 and the radially outer blade ring 1'. The area between the radially inner blade ring 1 and the radially outer blade ring 1' is here part of an annular space of the stator 100 and of the compressor 60.

The radially inner blade ring 1 forms an inner ring surface 10, which is provided radially outside relative to the radially inner blade ring 1. The radially outer blade ring 1' too forms an outer ring surface 10', which is provided radially inside relative to the outer blade ring 1'.

Two adjacent stator blades 2, the inner ring surface 10 and the outer ring surface 10' each form a blade duct of the stator 100. The blade duct forms part of the annular space.

It is provided that at least some of the stators form three-dimensionally contoured surfaces which delimit the stator blade duct radially inside and/or radially outside. Thus in the exemplary embodiment of FIG. 1, a three-dimensional structuring having changing radii both in the axial direction and in the circumferential direction is provided both on the inner ring surface 10 and on the outer ring surface 10'. A three-dimensional contouring of this type can apply both on the radially inner ring surface 10 and the radially outer ring surface 10', or only on one of these ring surfaces 10, 10'. The detailed representations Z2 and Z3 in FIG. 1 each show the three-dimensionally contoured surfaces 10, 10' on the radially inner blade ring 1 and on the radially outer blade ring 1', and the stator blades 2.

The radially outer blade ring 1' is formed by an outer stator blade carrier which is part of an outer casing 30 of the compressor 60. The radially inner blade ring 1 is formed by an inner stator blade carrier on the hub side. Optionally an adjusting device (not shown) can be provided here additionally, using which the stator blades 2 are adjustable with respect to their alignment.

FIG. 1 furthermore shows a rotor 60 having a rotary element designed as a disk 7, with a blade ring and rotor blades 40 arranged thereon. The blade ring has a ring surface 41, which like the ring surfaces 10, 10' of the stator 100 is three-dimensionally contoured, with the ring surface 41 having changing radii both in the axial direction and in the circumferential direction. The shape described further below with reference to FIGS. 2, 3A and 3B can also be provided on the ring surface 41 of the rotor 60. In this case, both rotor and stator of an axial compressor stage are formed with three-dimensionally contoured ring surfaces.

The detailed view Z1 of FIG. 1 shows in a perspective view the blade ring of the rotor with the three-dimensionally contoured ring surface 41 and the rotor blades 40. It is pointed out here that the provision of a three-dimensional contouring on the ring surface of a rotor 60 is merely optional.

Based on FIGS. 2, 3A and 3B, exemplary embodiments of a three-dimensional contouring of the inner ring surface 10 of the radially inner blade ring 1 of the stator 100 are explained in the following. It is pointed out here that the outer ring surface 10' can be contoured in a corresponding or in a similar manner. The following statements relating to FIGS. 2, 3A and 3B thus apply in corresponding manner for the outer ring surface 10' of the radially outer blade ring 1'.

FIG. 2 shows a plan view onto a partial area of an inner blade ring 1 of a stator developed in the drawing plane. The blade ring 1 has an axially front face 11 and an axially rear face 12, between which extends an outside surface of the inner blade ring 1, hereinafter referred to as inner ring surface 10 or simply ring surface 10. Several stator blades 2 are connected to the inner blade ring 1. Two adjacent stator blades 2 form between them a blade duct 3 which is part of an annular space provided between the inner blade ring 1 and an outer blade ring 1' (cf. FIG. 1).

Each stator blade 2 has a suction side 22 and a pressure side 21. The blade duct 3 between two stator blades 2 is delimited laterally by the suction side 21 of the one stator blade 2 and by the pressure side 21 of the other stator blade 2. In the radial direction, the blade duct 3 is delimited radially inwards by the ring surface 10 and radially outwards by the surface of an outer blade ring, corresponding to the surface 10' of FIG. 1.

The ring surface 10 is three-dimensionally contoured, i.e. it has changing radii both in the axial and circumferential directions. The radius change is steady in the mathematical sense, i.e. it has no discontinuities. The three-dimensional contouring is indicated by the contour lines 4 shown in FIG. 2, with the respective contour lines indicating lines with constant radius. The radius relates to the radial distance to the central axis 20 of the stator (cf. FIG. 1).

From the representation of the contour lines 4 it is clear that the ring surface in the axial direction x (and here following the curvature of the stator blades 2) initially passes through a concave indentation or valley 51 and then a convex elevation or peak 52. It can also be seen that the contouring in the circumferential direction between two stator blades 2 is not symmetrical. In particular, the peak 52 is located closer to the suction side 22 of the respective stator blade 2 than to the pressure side 21.

The contouring with a concave indentation 51 at the start of the blade duct 3 formed by two each stator blades 2 and a convex elevation 52 located behind said indentation 51 in the axial direction improves the flow in the blade duct, since the inflowing air can flow into it with minor losses by means of the indentation 51 at the start of the blade duct. The improved aerodynamics permit a reduction in the flow losses at the rim areas of the blade duct 3 and the risk of a blockage.

It can furthermore be seen from FIG. 2 that the three-dimensional contouring of the ring surface 10 does not already start at the faces 11, 12 of the blade ring 1. At the faces 11, 12 the blade ring 1 is designed circular, so that at the inlet side and at the outlet side a rotation-symmetrical edge with fixed radius is provided. The three-dimensional contouring starts only from an axial value $x_{start}$ (indicated by a dotted line), and it ends at an axial value $x_{end}$. It is however pointed out that in other exemplary embodiments it can be provided that the three-dimensional contouring extends up to the faces 11, 12.

A circular rim with constant radius at the axially front face 11 and at the axially rear face 12 is implemented here in one embodiment of the invention, however not necessarily, in order to assure a transition as loss-free as possible from one blade row to the next blade row.

It is pointed out that the three-dimensional contouring shown in FIG. 2 must be understood only as an example. Thanks to dispensing with symmetries required in the state of the art when designing the ring surface, degrees of freedom result for the design of the ring surface which can also lead to different contouring forms. For example, it can be provided that the ring surface has depressions and elevations which are provided elsewhere in a different size and in different number. It is furthermore pointed out that a three-dimensional contouring can also be achieved by a ramp function not having any minimum and maximum values. With a ramp function, the radius in the axial direction increases linearly or substantially linearly. It can also be provided that a ramp function of this type is superimposed over a more complex three-dimensional contouring.

FIG. 3A shows in schematic form, using a sectional view extending transversely to the central axis of the stator, an exemplary embodiment of a three-dimensional contouring of a ring surface. Two stator blades 2, each with a suction side 22 and a pressure side 21 can be discerned. Between them the surface 10 of the blade ring 1 is contoured. The section shown results in a surface line 6 showing the variation of the radius r in the circumferential direction φ. The representation is made in the cylinder coordinate system, where the circumferential angle φ and the distance r from the rotary axis (not shown) of the stator are stated. The radius r has a mean value r0, about which the current radius r varies depending on the circumferential angle φ. FIG. 3A shows here two typical radii r1, r2 for the circumferential angles φ1 and φ2.

In the exemplary embodiment shown, the surface line 6 follows a sine or a cosine function. This is distinguished by a period length, a phase position φ and an amplitude A relating to the average radius $r_0$. It applies here that the radius r can assume values between $r_0+A$ and $r_0+A$ and varies between these values. The period length is selected such that it is equal to the stator blade pitch. The angle φ indicates the phase position of the trigonometric function 6.

Instead of an individual sine or cosine function as shown in FIG. 3A, a combination of sine and cosine functions can also be used, each having a certain period length, a certain amplitude and a certain phase position. The period length is here in one design variant identical for all combined functions and corresponds to the stator blade pitch.

Modelling of the three-dimensional surface 10 by means of trigonometric functions permits in a simple manner, i.e. by using a few parameters, the design of the surface 10. This is particularly advantageous when programming a metal-cutting machine, using which the ring surface 10 is contoured.

In an embodiment, it is provided that the entire ring surface 10 or at least a partial area is designed by means of the same trigonometric functions, in the exemplary embodiment of FIG. 3 by means of the trigonometric function 6. To do so, it is provided that only the phase position φ and/or the amplitude A is varied depending on the axial distance x. Thus the same trigonometric function 6 or the same combination of trigonometric functions applies to all sections through the ring surface 10 with differing axial values of x. Only the phase position φ and/or the amplitude A depend on the axial value x.

It should be noted that by a gradual reduction of the amplitude A towards the axial faces 11, 12 a circular form can be achieved at the faces 11, 12 in a simple manner.

In a design variant, it can be provided that in addition an amount is added to the amplitude A in linearly dependent manner on the axial value x, for example in order to achieve a three-dimensional contouring in conjunction with a rising ramp in the direction of the rear face 12.

The use of sine and cosine functions or their combination permits in a simple manner a parameterization of the three-dimensional contour of the ring surface 10. The parameters using which the three-dimensional contour of the ring surface 10 can be mathematically described are reduced to a small number. This corresponds to a reduction of the available degrees of freedom. It is possible to already obtain a very good design of the wall surfaces with the described parameterization. In an embodiment, the number of parameters or degrees of freedom, respectively, is two to five.

FIG. 3B shows in schematic and exemplary form a longitudinal section through a three-dimensionally contoured blade ring 1. The resultant surface line 8 indicates the radius r, i.e. the distance from the central axis 20, as a function of the axial value x. The representation again uses cylinder coordinates, namely the cylinder coordinates r and x.

It can be seen here that the surface line 8 initially has values below the average radius $r_0$. This corresponds to a valley 51 shown in FIG. 2. In the further course, the surface line 8 assumes values above the average radius $r_0$. This corresponds to a peak 52 shown in FIG. 2. The form of the surface line 8 results from the values for A and φ as a function of x for the parameterization explained in relation to FIG. 3A.

The sections shown in FIGS. 3A and 3B define as examples three-dimensional structures that define a steadily changing radius in the circumferential direction and in the axial direction. The surface lines 6, 8 defined in the sectional representations of FIGS. 3A, 3B, and hence the ring surface 10 overall, can here be designed asymmetrical relative to the arrangement of two adjacent stator blades 2 each. In exemplary embodiments, the ring surface runs at least in partial areas both in the circumferential direction and in the axial direction asymmetrically. It is also provided in one exemplary embodiment that the three-dimensional surface structuring is such that the ring surface 10 in the area between two rotors 2 forms at least one convex elevation. This can be achieved singly or in combination with one or more concave depressions.

FIG. 4 shows a diagram indicating the pressure loss coefficient as a function of the annular space height (duct height). The continuous line indicates the values for a conventional stator and the dashed line the values for a stator in accordance with the present invention with three-dimensional contouring of the ring surfaces, as described in examples using the FIGS. 2, 3A, 3B.

The result is that with a low and with a high annular space height, i.e. adjoining the respective ring surface, there are considerable differences in the pressure loss coefficient, in particular adjoining the radially outer blade ring. The differences are significant. The pressure loss coefficient indicates the pressure loss occurring with flows of gas through the stator blade duct. The pressure loss is concomitant with an energy loss. An energy and pressure loss of this type is among others caused by friction between the gas and the circumferential walls and the associated turbulences. FIG. 4 shows that the energy and pressure loss can be reduced by three-dimensional structuring, in accordance with the invention, of the ring surfaces or of the stator casing, respectively.

FIG. 5 shows a diagram indicating firstly the relative pressure ratio and secondly the adiabatic efficiency η as a function of the relative mass flow. The relative pressure ratio is the overall pressure ratio divided by a reference quantity determined by the design point. The relative mass flow is the reduced mass flow (inlet mass flow function) divided by a reference quantity likewise determined by the design point. As a result, dimension-free quantities are obtained for the pressure ratio and the mass flow.

In the graphs, the unfilled triangles indicate measured values for a stator not provided with three-dimensional contouring. The filled-in triangles indicate measured values for a stator having ring surfaces with a three-dimensional contouring.

It can be seen that the adiabatic efficiency with a three-dimensional contouring of the ring surfaces in accordance with the invention is considerably increased. The increase in the efficiency is 1.20%.

The course of the relative pressure ratio also makes clear the advantages of the teachings in accordance with the invention. The relative pressure ratio indicates in FIG. 5 the pressure ratio in front of and behind a compressor stage including the stator being considered. A higher pressure ratio means a higher efficiency. Here too, the stators designed in accordance with the invention have a better ratio.

The invention is restricted in its design not to the exemplary embodiments presented above, which must be understood merely as examples. In particular, the forms shown of the three-dimensional contouring of the inner and outer blade rings and of the stator blades must be understood only as examples. It is also pointed out that a three-dimensional contouring does not have to be provided in the entire area between two stator blades, but can also be provided only in partial areas. The use of a stator in accordance with the invention is furthermore not restricted to a jet engine. It can also be used in axial compressor stages of other turbomachines.

What is claimed is:

1. A stator of an axial compressor stage of a turbomachine, comprising:
a radially outer blade ring forming an outer ring surface,
a radially inner blade ring forming an inner ring surface,
a plurality of stator blades connected to the blade rings,
wherein at least one chosen from the outer ring surface and the inner ring surface has at least in a partial area a changing radius relative to a central axis of the stator both in an axial direction and in a circumferential direction,
wherein for at least one longitudinal section through at least one chosen from the radially outer blade ring and the radially inner blade ring, a resulting surface line between an axial start value and an axial end value has a steadily changing radius, and wherein the axial start value—in the axial direction—is positioned upstream of leading edges of the stator blades and wherein the axial end value—in the axial direction—is positioned downstream of trailing edges of the stator blades;
wherein the at least one chosen from the outer ring surface and the inner ring surface between the axial start value and the downstream leading edges of the stator blades, and also between the trailing edges of the stator blades and the downstream axial end value, includes a changing radius relative to the central axis of the stator in the circumferential direction;
wherein the changing radius includes a convex elevation with respect to a mean radius $r_0$ of the at least one chosen from the outer ring surface and the inner ring surface, wherein the convex elevation has a larger radius than the mean radius $r_0$;
wherein the convex elevation extends along a center line of the inter-vane passage an entire length from a position at 50% of an axial chord length of the stator vanes to a position at trailing edges of the stator vanes.

2. The stator in accordance with claim 1, wherein, for at least one section through at least one chosen from the radially outer blade ring and the radially inner blade ring in a plane normal to the central axis, a resulting surface line in an area between two stator blades has a steadily changing radius.

3. The stator in accordance with claim 1, wherein for at least one section through at least one chosen from the radially outer blade ring and the radially inner blade ring in a plane normal to the central axis, a resulting surface line in an area between two stator blades is asymmetrical.

4. The stator in accordance with claim 3, wherein a ring surface between two adjacent stator blades is shaped such that adjoining a suction side of one of the two adjacent stator blades, the at least one chosen from the outer ring surface and the inner ring surface has higher radii than adjoining a pressure side of the other of the two adjacent stator blades.

5. The stator in accordance with claim 1, wherein for at least one section through at least one chosen from the radially outer blade ring and the radially inner blade ring in a plane normal to the central axis, a resulting surface line in an area between two stator blades has a convex bulge having a larger radius than a mean radius $r_0$ of the at least one chosen from the outer ring surface and the inner ring surface.

6. The stator in accordance with claim 1, wherein for at least one longitudinal section through at least one chosen from the radially outer blade ring and the radially inner blade ring, a resulting surface line has a convex bulge having a larger radius than a mean radius $r_0$ of the at least one chosen from the outer ring surface and the inner ring surface.

7. The stator in accordance with claim 1, wherein at least one chosen from the inner ring surface and the outer ring surface is shaped such that in a direction of an axially rear face of at least one chosen from the outer blade ring and the inner blade ring, the at least one chosen from the inner ring surface and the outer ring surface first has a concave depression and then spaced from the concave depression, a convex elevation with respect to a mean radius $r_0$ of the at least one chosen from the outer ring surface and the inner ring surface, wherein the convex elevation has a larger radius than the mean radius $r_0$ and the concave depression has a smaller radius than the mean radius $r_0$.

8. The stator in accordance with claim 1,
wherein a first surface line of a first section through at least one chosen from the radially outer blade ring and the radially inner blade ring in a plane normal to the central axis conforms to a mathematical function;
wherein at least one second surface line of a second section through the at least one chosen from the radially outer blade ring and the radially inner blade ring adjacent to the first section in a plane normal to the central axis is defined by a same mathematical function as the first surface line, but having at least one chosen from a different phase position and a different amplitude relative to the first surface line.

9. The stator in accordance with claim 1, wherein a course of a radius of the at least one chosen from the inner ring surface and the outer ring surface is parameterized by at least one chosen from an amplitude and a phase position of one trigonometric function, with values for the at least one chosen from the amplitude and phase position depending on a circumferential angle and an axial position with respect to the stator.

10. The stator in accordance with claim 9, wherein the trigonometric function is a sine function or a cosine function.

11. The stator in accordance with claim 1, wherein at least one chosen from the inner ring surface and the outer ring surface has a same three-dimensional contour between each adjacent pair of stator blades of the stator.

12. The stator in accordance with claim 1, wherein the radially outer blade ring is part of a compressor casing.

13. The stator in accordance with claim 1, wherein the axial start value is at an axial front face of the blade ring and the axial end value is at an axial rear face of the blade ring.

14. The stator in accordance with claim 1, wherein the at least one chosen from the outer ring surface and the inner ring surface is shaped in a complete area between two stator blades to have, in a direction of an axially rear face of the blade ring, first a concave depression and then a convex elevation with respect to a mean radius $r_0$ of the at least one chosen from the outer ring surface and the inner ring surface, wherein the convex elevation has a larger radius than the mean radius $r_0$ and the concave depression has a smaller radius than the mean radius $r_0$.

15. The stator in accordance with claim 1, wherein the convex elevation includes a portion positioned between approximately 50-70% axial chord length of the stator vanes, and wherein a most elevated portion of the convex elevation at any axial position between the approximately 50-70% axial chord length of the stator vanes is positioned between but spaced away from opposing sides of the two adjacent stator blades.

16. The stator in accordance with claim 15, wherein the resulting surface line further includes a concave depression having a smaller radius than the mean radius $r_0$ circumferentially positioned between the convex elevation and at least one of the opposing sides of the two adjacent stator blades between the approximately 50-70% axial chord length of the stator vanes.

17. The stator in accordance with claim 15, wherein the resulting surface line further includes a concave depression having a smaller radius than the mean radius $r_0$ circumferentially positioned between the convex elevation and each of the opposing sides of the two adjacent stator blades between the approximately 50-70% axial chord length of the stator vanes.

18. A stator of an axial compressor stage of a turbomachine, comprising:
  a radially outer blade ring forming an outer ring surface,
  a radially inner blade ring forming an inner ring surface,
  a plurality of stator blades connected to the blade rings,
  wherein at least one chosen from the outer ring surface and the inner ring surface has at least in a partial area a changing radius relative to a central axis of the stator both in an axial direction and in a circumferential direction,
  wherein the at least one chosen from the outer ring surface and the inner ring surface is shaped in a complete inter-vane passage between two stator blades to have, in a direction of an axially rear face of the blade ring, first a concave depression and then a convex elevation with respect to a mean radius $r_0$ of the at least one chosen from the outer ring surface and the inner ring surface, wherein the convex elevation has a larger radius than the mean radius $r_0$ and the concave depression has a smaller radius than the mean radius $r_0$;
  wherein the convex elevation extends along a center line of the inter-vane passage an entire length from a position at 50% of an axial chord length of the stator vanes to a position at trailing edges of the stator vanes.

19. The stator in accordance with claim 18, wherein a most elevated portion of the convex elevation at any axial position between the position at 50% of the axial chord length of the stator vanes to a position at approximately 70% axial chord length of the stator vanes is positioned between but spaced away from opposing sides of the two stator blades.

20. The stator in accordance with claim 19, wherein the at least one chosen from the outer ring surface and the inner ring surface further includes a concave depression with respect to the mean radius $r_0$ circumferentially positioned between the convex elevation and at least one of the opposing sides of the two stator blades between the position at 50% of the axial chord length of the stator vanes to the position at approximately 70% axial chord length of the stator vanes.

21. The stator in accordance with claim 19, wherein the at least one chosen from the outer ring surface and the inner ring surface further includes a concave depression with respect to the mean radius $r_0$ circumferentially positioned between the convex elevation and each of the opposing sides of the two adjacent stator blades between the position at 50% of the axial chord length of the stator vanes to the position at approximately 70% axial chord length of the stator vanes.

* * * * *